United States Patent
Jain et al.

(10) Patent No.: US 11,768,987 B2
(45) Date of Patent: Sep. 26, 2023

(54) SYSTEM FOR FACILITATING SECURE COMMUNICATION IN SYSTEM-ON-CHIPS

(71) Applicant: NXP USA, Inc., Austin, TX (US)

(72) Inventors: Sandeep Jain, Noida (IN); Kirk Taylor, Austin, TX (US); Vivek Sharma, New Delhi (IN); Arpita Agarwal, Delhi (IN)

(73) Assignee: NXP USA, INC., Austin, TX (US)

( * ) Notice: Subject to any disclaimer, the term of this patent is extended or adjusted under 35 U.S.C. 154(b) by 601 days.

(21) Appl. No.: 16/836,945

(22) Filed: Apr. 1, 2020

(65) Prior Publication Data

US 2021/0312115 A1 Oct. 7, 2021

(51) Int. Cl.
  *G06F 30/38* (2020.01)
  *G06F 9/30* (2018.01)
  *G06F 7/58* (2006.01)
  *G06F 30/398* (2020.01)

(52) U.S. Cl.
  CPC ............. *G06F 30/38* (2020.01); *G06F 7/58* (2013.01); *G06F 9/30021* (2013.01); *G06F 30/398* (2020.01)

(58) Field of Classification Search
  CPC .................................. G06F 30/38; G06F 7/58
  USPC .......................................................... 703/14
  See application file for complete search history.

(56) References Cited

U.S. PATENT DOCUMENTS

| | | |
|---|---|---|
| 2005/0235179 A1 | 10/2005 | Pistoulet |
| 2012/0054863 A1* | 3/2012 | Morin .................. H03K 3/0375 726/22 |
| 2019/0324422 A1* | 10/2019 | Capodanno ............. G06F 11/07 |
| 2020/0014090 A1* | 1/2020 | Jung ........................ H01Q 1/38 |
| 2020/0143090 A1* | 5/2020 | Patki ..................... H03K 19/003 |
| 2022/0215089 A1* | 7/2022 | Hershman ............... G06F 21/78 |
| 2022/0223186 A1* | 7/2022 | Ji ............................ G11C 29/52 |
| 2022/0334936 A1* | 10/2022 | Srivastava .......... G06F 11/1675 |

OTHER PUBLICATIONS

Timmers, N. et al. "Controlling PC on ARM using Fault Injection", Riscure, retrieved from the internet at: https://www.riscure.com/uploads/2017/09/Controlling-PC-on-ARM-using-Fault-Injection.pdf, 11 pgs. (2017).

(Continued)

*Primary Examiner* — Suchin Parihar

(57) ABSTRACT

A system to facilitate communication of a critical signal between functional circuitries of a system-on-chip utilizes a dynamic pattern to securely communicate the critical signal. The system includes selection and comparison circuits. The selection circuit is configured to select and output a set of dynamic pattern bits or a set of fixed reference bits, based on a logic state of the critical signal that is received from one functional circuitry. The comparison circuit is configured to output an output signal based on the set of dynamic pattern bits, and a set of intermediate bits that is derived from the set of dynamic pattern bits or the set of fixed reference bits. The output signal is provided to the other functional circuitry when a logic state of the output signal matches the logic state of the critical signal, thereby securely communicating the critical signal to the other functional circuitry.

20 Claims, 2 Drawing Sheets

(56) References Cited

OTHER PUBLICATIONS

Selmke, B. et al. "Attack on a DFA protected AES by Simultaneous Laser Fault Injections", IEEE 2016 Workshop on Fault Diagnosis and Tolerance in Cryptography, retrieved from the internet at: https://ieeexplore.ieee.org/stamp/stamp.jsp?tp-&arnumber-7774480, 11 pgs. (2016).
Fumaroli, G., "Blinded Fault Resistant Exponentiation", Fault Diagnosis and Tolerance in Cryptography, Oct. 10, 2006.
Karaklajic, D., "Hardware Designer's Guide to Fault Attacks", IEEE Transactions on Very Large Scale Integration (VLSI) Systems, vol. 21, No. 12, Dec. 2013.

* cited by examiner

SYSTEM FOR FACILITATING SECURE COMMUNICATION IN SYSTEM-ON-CHIPS

BACKGROUND

The present disclosure relates generally to electronic circuits, and, more particularly, to a system for facilitating secure communication of critical signals in system-on-chips (SoCs).

SoCs typically include various critical signals that, if flipped, compromise assets and/or security of the SoCs. Such critical signals are typically flipped by way of volt glitches, clock glitches, laser attacks, photo attacks, or the like. One solution to secure a critical signal against such glitches and attacks includes adding redundancy to the critical signal by implementing Triple-Voting-Flops (TVFs) in an SoC. The TVFs, however, are capable of protecting the critical signal exclusively from flipping of a single flip-flop (FF), and are thus incapable of providing protection against synchronized attacks that attack two or more FFs simultaneously. Another solution to secure the critical signal includes implementing, in an SoC, a protection system that includes the TVFs and circuitry to generate a fixed pattern. The fixed pattern, in addition to the TVFs, adds redundancy to the critical signal for securing the critical signal. However, as the pattern is fixed, an attacker may easily decode the fixed pattern and launch a synchronized attack targeting multiple FFs simultaneously to flip the critical signal, thereby compromising secure communication of the critical signal. Therefore, there exists a need for a system that solves the aforementioned problems to securely communicate critical signals.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
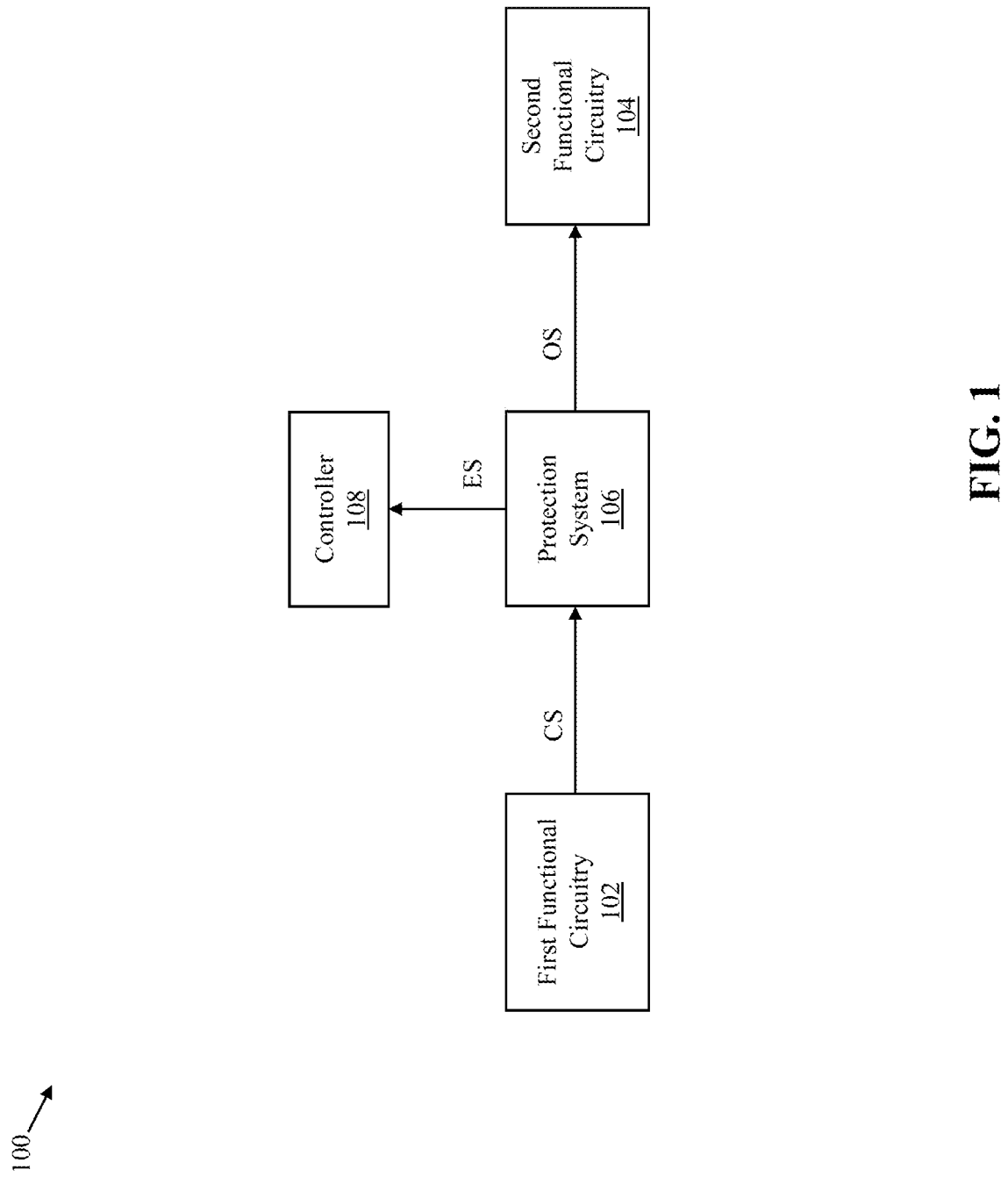
FIG. 1 is a schematic block diagram of a system-on-chip (SoC) in accordance with an embodiment of the present disclosure.

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In one embodiment, a protection system for facilitating secure communication of a critical signal from a first functional circuitry to a second functional circuitry is provided. The protection system includes a selection circuit and a comparison circuit. The selection circuit is coupled with the first functional circuitry, and is configured to receive the critical signal, a set of dynamic pattern bits, and a set of fixed reference bits. The selection circuit is further configured to select and output based on a logic state of the critical signal, one of the set of dynamic pattern bits and the set of fixed reference bits as a set of selected bits. The comparison circuit is coupled with the second functional circuitry, and is configured to receive the set of dynamic pattern bits and a set of intermediate bits. The set of intermediate bits is derived from the set of selected bits. The comparison circuit is further configured to output an output signal, and provide the output signal to the second functional circuitry when a logic state of the output signal matches the logic state of the critical signal, thereby facilitating secure communication of the critical signal.

In another embodiment, a system-on-chip (SoC) is provided. The SoC includes first and second functional circuitries and a protection system that is coupled between the first and second functional circuitries. The first functional circuitry is configured to generate a critical signal for communicating to the second functional circuitry, and the protection system is configured to facilitate secure communication of the critical signal from the first functional circuitry to the second functional circuitry. The protection system includes a selection circuit that is coupled with the first functional circuitry, and a comparison circuit that is coupled with the second functional circuitry. The selection circuit is configured to receive the critical signal, a set of dynamic pattern bits, and a set of fixed reference bits. Based on a logic state of the critical signal, the selection circuit is further configured to select and output one of the set of dynamic pattern bits and the set of fixed reference bits as a set of selected bits. The comparison circuit is configured to receive the set of dynamic pattern bits, and a set of intermediate bits that is derived from the set of selected bits. The comparison circuit is further configured to output an output signal, and provide the output signal to the second functional circuitry when a logic state of the output signal matches the logic state of the critical signal, thereby facilitating secure communication of the critical signal.

Various embodiments of the present disclosure provide a protection system that is coupled between two functional circuitries for facilitating secure communication of a critical signal from one functional circuitry to another functional circuitry. The protection system includes a selection circuit, a comparison circuit, and a pattern generator that is configured to generate a dynamic pattern. Based on a logic state of the critical signal that is received by the selection circuit from one functional circuitry, the selection circuit is configured to select and output one of a set of dynamic pattern bits of the dynamic pattern and a set of fixed reference bits of a fixed pattern. A set of intermediate bits is derived from the set of dynamic pattern bits or the set of fixed reference bits. Based on a comparison of the set of dynamic pattern bits and the set of intermediate bits, the comparison circuit is configured to output and provide an output signal to the other functional circuitry when the logic state of the critical signal and a logic state of the output signal match. Thus, the protection system of the present disclosure relies on a dynamic pattern to facilitate secure communication of the critical signal from one functional circuitry to another functional circuitry. The dynamic pattern is updated based on a reset of the protection system or a lapse of a predetermined time duration. Hence, it is difficult for an attacker to successfully decode the set of dynamic pattern bits and launch a synchronized attack to flip the critical signal. The protection system of the present disclosure thus has additional security as compared to conventional protection systems.

Referring now to FIG. 1, a schematic block diagram of a system-on-chip (SoC) 100 in accordance with an embodiment of the present disclosure is shown. The SoC 100 includes first and second functional circuitries 102 and 104 and a protection system 106 coupled between the first and second functional circuitries 102 and 104. The SoC 100 further includes a controller 108 that is coupled with the protection system 106. The SoC 100 may be included in automotive devices, network devices, or the like.

The first functional circuitry 102 is configured to generate a critical signal CS for communicating to the second functional circuitry 104. The critical signal CS may enable the first functional circuitry 102 to control one or more critical operations associated with the second functional circuitry 104. For example, based on a logic state of the critical signal CS, the first functional circuitry 102 may be configured to access one or more secure functions of the second functional circuitry 104, sensitive data associated with the second functional circuitry 104, or the like. Examples of the first and second functional circuitries 102 and 104 include processors, registers, memories, or the like.

The protection system 106 is configured to facilitate secure communication of the critical signal CS from the first functional circuitry 102 to the second functional circuitry 104, to secure the critical signal CS against synchronized attacks. A synchronized attack may correspond to a simultaneous attack on multiple redundant storage elements (e.g., flip-flops (shown later in FIG. 2), latches, or the like) of the SoC 100 to flip the logic states of the critical signals (e.g., the critical signal CS). The redundant storage elements add redundancy to the critical signals, i.e., facilitate replication of the critical signals. To facilitate secure communication of the critical signal CS, the protection system 106 is configured to receive the critical signal CS, output an output signal OS, and provide the output signal OS to the second functional circuitry 104 when a logic state of the output signal OS matches the logic state of the critical signal CS. A match between the logic states of the critical signal CS and the output signal OS indicates that when the critical signal CS is at one logic state, such as a logic low state, the output signal OS is outputted at the same logic state of the critical signal CS, i.e., the output signal OS is outputted at a logic low state. Similarly, when the critical signal CS is at a logic high state, the output signal OS is outputted at a logic high state, i.e., at the same logic state of the critical signal CS.

A match between the logic states of the output signal OS and the critical signal CS further indicates an absence of a synchronized attack on the protection system 106 due to which the protection system 106 thus securely communicates the critical signal CS (i.e., the logic state of the critical signal CS) to the second functional circuitry 104. The second functional circuitry 104 is configured to receive the output signal OS, and execute one or more critical operations (i.e., provide the first functional circuitry 102 access to the secure functions, sensitive data, or the like). In an event of a synchronized attack, the logic states of the critical signal CS and the output signal OS do not match (i.e., the logic states of the critical signal CS and the output signal OS are different). For example, if the critical signal CS is at a logic high state, the output signal OS is outputted at a logic low state. In such a scenario, as the logic state of the output signal OS is different than the logic state of the critical signal CS, the critical signal CS is not provided to the second functional circuitry 104.

The protection system 106 is further configured to detect an error that may be introduced in the protection system 106 as a result of the synchronized attacks. The error may be detected based on a mismatch between the logic states of the critical signal CS and the output signal OS. The protection system 106 is further configured to output and provide an error signal ES that is indicative of the detected error to the controller 108. In an example, the error signal ES may be outputted at a logic high state when the logic states of the critical signal CS and the output signal OS do not match. The protection system 106 may be reset based on a reset of the SoC 100 or based on a reset signal (not shown) received from the controller 108. The protection system 106 is explained in detail in conjunction with FIG. 2.

The controller 108 is coupled with the protection system 106, and is configured to receive the error signal ES. Based on the error signal ES, the controller 108 may be configured to execute various safety operations associated with the SoC 100 to prevent communication of erroneous data (i.e., the output signal OS that is at a different logic state than the critical signal CS) to the second functional circuitry 104. In an embodiment, the controller 108 executes the safety operations when the error signal ES is at a logic high state. To execute the safety operations, the controller generates and provides the reset signal to the protection system 106. Examples of the safety operations include a reset of the SoC 100, a shutdown of the SoC 100, or the like.

Figure 2:
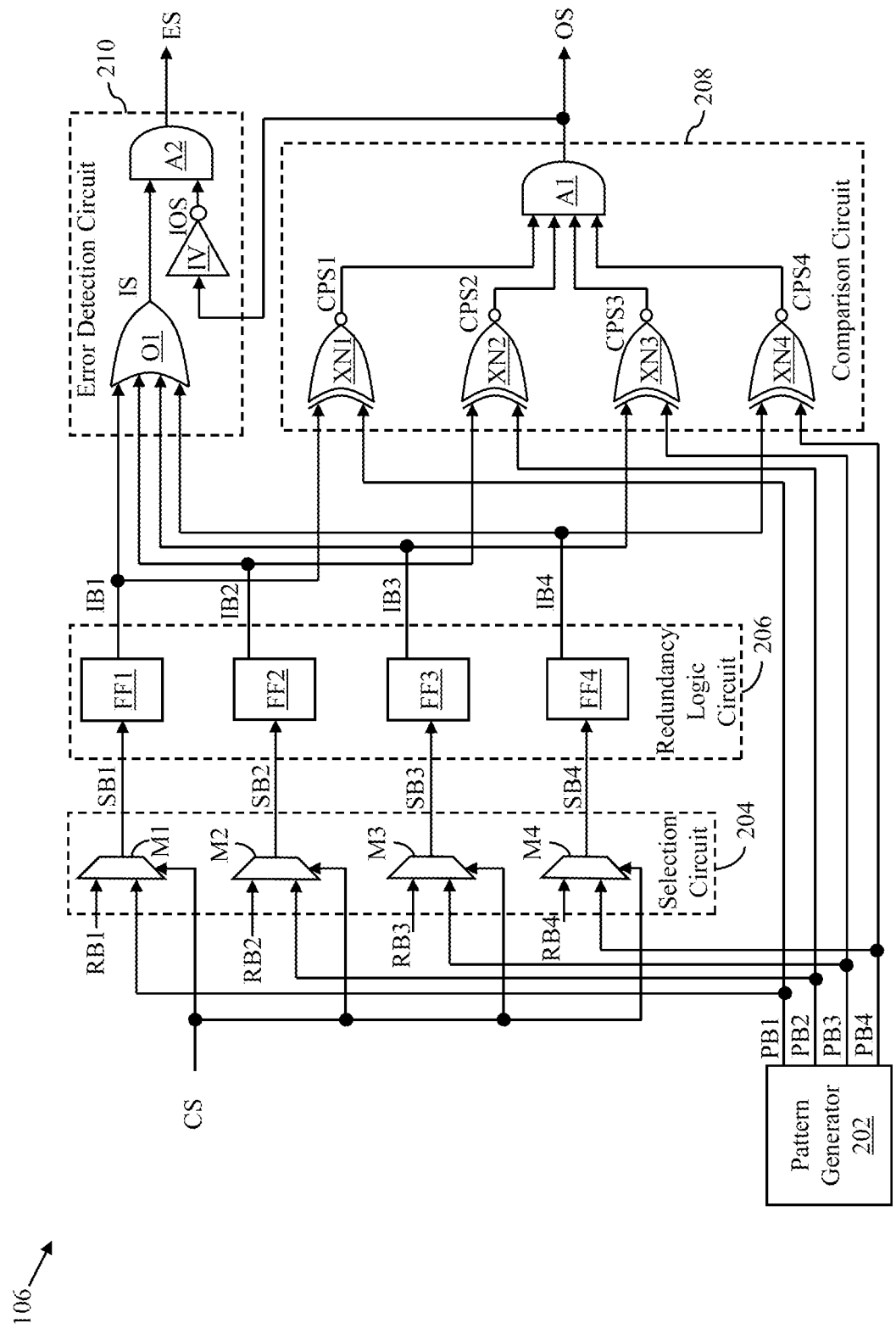
FIG. 2 is a schematic circuit diagram of a protection system of the SoC of FIG. 1 in accordance with an embodiment of the present disclosure.

Referring now to FIG. 2, a schematic circuit diagram of the protection system 106 in accordance with an embodiment of the present disclosure is shown. The protection system 106 includes a pattern generator 202, a selection circuit 204, a redundancy logic circuit 206, a comparison circuit 208, and an error detection circuit 210.

The pattern generator 202 is configured to generate a dynamic pattern that includes a set of binary bits, and is utilized for facilitating secure communication of the critical signal CS. The dynamic pattern has first through fourth dynamic pattern bits PB1-PB4, collectively referred to as a "set of dynamic pattern bits PB1-PB4". The pattern generator 202 is further configured to update the set of dynamic pattern bits PB1-PB4 based on at least one of a reset of the protection system 106 (i.e., after each reset of the protection system 106) and a lapse of a predetermined time duration. For example, if a current dynamic pattern corresponds to a '1010' pattern, an updated dynamic pattern may correspond to a '1101' pattern. Further, if the predetermined time duration is 100 nanoseconds (ns), the set of dynamic pattern bits PB1-PB4 is updated every 100 ns, thus facilitating a periodic update of the set of dynamic pattern bits PB1-PB4. For the sake of ongoing discussion and without limiting the scope of the present disclosure, it is assumed that the set of dynamic pattern bits PB1-PB4 is not generated at a same logic state to assist secure communication of the critical signal CS. In an example, the dynamic pattern generated and updated by the pattern generator 202 may not include a '0000' pattern or a '1111' pattern. Hence, when the dynamic pattern includes four dynamic pattern bits (i.e., the set of dynamic pattern bits PB1-PB4), the dynamic pattern has $2^4-2$ (i.e., 14) possible combinations. The pattern generator 202 is at least one of a true random number generator and a pseudo-random number generator.

The selection circuit 204 is coupled with the pattern generator 202 and the first functional circuitry 102, and is configured to receive the set of dynamic pattern bits PB1-PB4, the critical signal CS, and first through fourth fixed reference bits RB1-RB4, collectively referred to as a "set of fixed reference bits RB1-RB4". The set of fixed reference bits RB1-RB4), i.e., a fixed pattern, is generated by a reference bit generator (not shown) that may be internal or external to the protection system 106. The reference bit generator may include circuitry that is programmed to generate the set of fixed reference bits RB1-RB4 such that the set of fixed reference bits RB1-RB4 remains same at each start-up of the SoC 100. In the presently preferred embodiment, each fixed reference bit is at a logic low state, i.e., the set of fixed reference bits RB1-RB4 corresponds to '0000'. In another embodiment, each fixed reference bit is at a logic high state, i.e., the set of fixed reference bits RB1-RB4 corresponds to '1111'. In yet another embodiment, the set of fixed reference bits RB1-RB4 is a combination of '0' and '1', such as '0101', 1011', or the like. Further, based on the logic state of the critical signal CS, the selection circuit 204 is configured to select and output one of the set of dynamic pattern bits PB1-PB4 and the set of fixed reference bits RB1-RB4 as first through fourth selected bits SB1-SB4, collectively referred to as a "set of selected bits SB1-SB4".

The selection circuit 204 includes a set of multiplexers (MUXs), of which first through fourth multiplexers (MUXs) M1-M4 are shown. A select terminal of each of the first through fourth MUXs M1-M4 is coupled with the first functional circuitry 102, and is configured to receive the critical signal CS. Further, first and second input terminals of each of the first through fourth MUXs M1-M4 are coupled with the pattern generator 202 and the reference bit generator, respectively. Thus, the first input terminal of each of the first through fourth MUXs M1-M4 is configured to receive a corresponding dynamic pattern bit of the set of dynamic pattern bits PB1-PB4. In other words, the first input terminals of the first and second MUXs M1 and M2 receive the first and second dynamic pattern bits PB1 and PB2, respectively, whereas the first input terminals of the third and fourth MUXs M3 and M4 receive the third and fourth dynamic pattern bits PB3 and PB4, respectively. Further, the second input terminal of each of the first through fourth MUXs M1-M4 is configured to receive a corresponding fixed reference bit of the set of fixed reference bits RB1-RB4. Thus, the second input terminals of the first and second MUXs Mich. and M2 receive the first and second fixed reference bits RB1 and RB2, respectively, whereas the second input terminals of the third and fourth MUXs M3 and M4 receive the third and fourth fixed reference bits RB3 and RB4, respectively. An output terminal of each of the first through fourth MUXs M1-M4 is configured to output a corresponding selected bit of the set of selected bits SB1-SB4. Thus, the output terminals of the first and second MUXs M1 and M2 output the first and second selected bits SB1 and SB2, respectively, and the output terminals of the third and fourth MUXs M3 and M4 output the third and fourth selected bits SB3 and SB4, respectively.

When the critical signal CS is activated (i.e., the critical signal CS is at a logic high state), the selection circuit 204 (i.e., the first through fourth MUXs M1-M4) selects and outputs the set of dynamic pattern bits PB1-PB4 as the set of selected bits SB1-SB4. Conversely, when the critical signal CS is deactivated (i.e., the critical signal CS is at a logic low state), the selection circuit 204 selects and outputs the set of fixed reference bits RB1-RB4 as the set of selected bits SB1-SB4.

The redundancy logic circuit 206 is coupled with the selection circuit 204 and the comparison circuit 208. The redundancy logic circuit 206 is configured to receive and store the set of selected bits SB1-SB4 and output first through fourth intermediate bits IB1-IB4, collectively referred to as a "set of intermediate bits IB1-IB4". The set of intermediate bits IB1-IB4 is outputted such that each intermediate bit of the set of intermediate bits IB1-IB4 is derived from a corresponding selected bit of the set of selected bits SB1-SB4. Thus, the first and second intermediate bits IB1 and IB2 are derived from the first and second selected bits SB1 and SB2, respectively, and the third and fourth intermediate bits IB3 and IB4 are derived from the third and fourth selected bits SB3 and SB4, respectively. The redundancy logic circuit 206 is further configured to provide the set of intermediate bits IB1-IB4 to the comparison circuit 208 and the error detection circuit 210.

The redundancy logic circuit 206 includes a set of flip-flops (FFs) of which first through fourth FFs FF1-FF4 are shown. The first through fourth FFs FF1-FF4 correspond to the redundant storage elements of the protection system 106, and are configured to store the set of selected bits SB1-SB4, respectively. Each of the first through fourth FFs FF1-FF4 has an input terminal that is coupled with the selection circuit 204 (i.e., a corresponding output terminal of the first through fourth MUXs M1-M4), and is configured to receive and store a corresponding selected bit of the set of selected bits SB1-SB4. Further, each of the first through fourth FFs FF1-FF4 has an output terminal that is coupled with the comparison circuit 208 and the error detection circuit 210, and is configured to output and provide a corresponding intermediate bit of the set of intermediate bits IB1-IB4. It will be apparent to a person skilled in the art that the set of intermediate bits IB1-IB4 is outputted during a positive clock edge or a negative clock edge of a clock signal (not shown) that is generated by a clock generator (not shown) of the SoC 100. In an embodiment, the first through fourth FFs FF1-FF4 are D FFs.

When the first through fourth FFs FF1-FF4 are untampered by an attacker, the logic states of the set of intermediate bits IB1-IB4 are same as the logic states of the set of selected bits SB1-SB4, respectively. When the redundancy logic circuit 206 undergoes a synchronized attack, an error may be introduced in two or more FFs of the first through fourth FFs FF1-FF4 (i.e., the logic states of two or more selected bits of the set of selected bits SB1-SB4 that is stored in the first through fourth FFs FF1-FF4 may be flipped). As a result of the error, the set of intermediate bits IB1-IB4 may be outputted at logic states that are different than the logic states of the set of selected bits SB1-SB4, respectively. For example, when the first and third FFs FF1 and FF3 undergo a synchronized attack, the logic states of the first and third intermediate bits IB1 and IB3 (in an example, logic low and logic high states, respectively) are different than the logic states of the first and third selected bits SB1 and SB3 (in an example, logic high and logic low states, respectively).

Although the redundancy logic circuit 206 is shown to include FFs (i.e., the first through fourth FFs FF1-FF4), the scope of the present disclosure is not limited to it. In various other embodiments, the redundancy logic circuit 206 may include any other redundant storage element (e.g., latches), without deviating from the scope of the present disclosure.

The comparison circuit 208 is coupled with the redundancy logic circuit 206 and the pattern generator 202, and is configured to receive the set of intermediate bits IB1-IB4 and the set of dynamic pattern bits PB1-PB4. The comparison circuit 208 is further configured to output the output signal OS based on a comparison of each bit of the set of intermediate bits IB1-IB4 and each bit of the set of dynamic pattern bits PB1-PB4, respectively. The output signal OS is activated (i.e., outputted at a logic high state) when the logic states of the set of dynamic pattern bits PB1-PB4 match the logic states of the set of intermediate bits IB1-IB4, respectively. Conversely, the output signal OS is deactivated (i.e., outputted at a logic low state) when the logic states of the set of dynamic pattern bits PB1-PB4 are different than the logic states of the set of intermediate bits IB1-IB4, respectively. The comparison circuit 208 is further coupled with the second functional circuitry 104, and is configured to provide the output signal OS to the second functional circuitry 104 when the logic state of the output signal OS matches the logic state of the critical signal CS. The critical signal CS (i.e., a logic state of the critical signal CS) is thus securely communicated from the first functional circuitry 102 to the second functional circuitry 104.

The comparison circuit 208 includes a set of logic gates of which first through fourth logic gates XN1-XN4 are shown, and a fifth logic gate A1. In an embodiment, the first through fourth logic gates XN1-XN4 are exclusive-NOR (XNOR) gates, and the fifth logic gate A1 is an AND gate. Each of the first through fourth logic gates XN1-XN4 has a first input terminal that is coupled with the pattern generator 202, and is configured to receive a corresponding dynamic pattern bit of the set of dynamic pattern bits PB1-PB4. Each of the first through fourth logic gates XN1-XN4 further has a second input terminal that is coupled with a corresponding output terminal of the first through fourth FFs FF1-FF4, and is configured to receive a corresponding intermediate bit of the set of intermediate bits IB1-IB4. Thus, the first input terminals of the first through fourth logic gates XN1-XN4 are configured to receive the first through fourth dynamic pattern bits PB1-PB4, respectively, and the second input terminals of the first through fourth logic gates XN1-XN4 are configured to receive the first through fourth intermediate bits IB1-IB4, respectively. Each of the first through fourth logic gates XN1-XN4 further has an output terminal that is configured to output a corresponding comparison signal of first through fourth comparison signals CPS1-CPS4, collectively referred to as a "set of comparison signals CPS1-CPS4". Thus, the output terminals of the first through fourth logic gates XN1-XN4 are configured to output the first through fourth comparison signals CPS1-CPS4, respectively.

When the logic state of the first intermediate bit IB1 is same as that of the first dynamic pattern bit PB1, the first comparison signal CPS1 is outputted at a logic high state. Conversely, when the logic states of the first intermediate bit IB1 and the first dynamic pattern bit PB1 are different, the first comparison signal CPS1 is outputted at a logic low state. Similarly, the second through fourth comparison signals CPS2-CPS4 are outputted at logic low and logic high states based on the comparison of each bit of the second through fourth intermediate bits IB2-IB4 and each bit of the second through fourth dynamic pattern bits PB2-PB4, respectively.

The fifth logic gate A1 has a set of input terminals of which first through fourth input terminals are shown. The first through fourth input terminals of the fifth logic gate A1 are coupled with the output terminals of the first through fourth logic gates XN1-XN4, and are configured to receive the set of comparison signals CPS1-CPS4, respectively. The fifth logic gate A1 further has an output terminal that is configured to output the output signal OS based on the logic states of the set of comparison signals CPS1-CPS4. Further, the output terminal of the fifth logic gate A1 is coupled with the second functional circuitry 104, and is configured to provide the output signal OS to the second functional circuitry 104 when the logic state of the output signal OS matches the logic state of the critical signal CS.

The error detection circuit 210 is coupled with the redundancy logic circuit 206 and the comparison circuit 208. The error detection circuit 210 is configured to receive the set of intermediate bits IB1-IB4 and the output signal OS, and output the error signal ES. The error signal ES is indicative of the error associated with the storage of the set of selected bits SB1-SB4 in the redundancy logic circuit 206 (i.e., the first through fourth FFs FF1-FF4, respectively) that is introduced as a result of the synchronized attack. The error associated with the storage of the set of selected bits SB1-SB4 may correspond to flipping of the logic states of two or more selected bits of the set of selected bits SB1-SB4. The error detection circuit 210 may further be coupled with the controller 108, and is further configured to provide the error signal ES to the controller 108. The error detection circuit 210 includes sixth and seventh logic gates O1 and A2, and an inverter IV. In an embodiment, the sixth logic gate O1 is an OR gate, and the seventh logic gate A2 is an AND gate. Further, the inverter IV is a NOT gate.

The sixth logic gate O1 has a set of input terminals of which first through fourth input terminals are shown. The first through fourth input terminals of the sixth logic gate O1 are coupled with the redundancy logic circuit 206 (i.e., the output terminals of the first through fourth FFs FF1-FF4, respectively), and are configured to receive the set of intermediate bits IB1-IB4, respectively. The sixth logic gate O1 further has an output terminal that is configured to output an intermediate signal IS based on the logic states of the set of intermediate bits IB1-IB4. When the first through fourth intermediate bits IB1-IB4 are at logic low states (i.e., the set of intermediate bits IB1-IB4 correspond to the set of fixed reference bits RB1-RB4, respectively), the intermediate signal IS is outputted at a logic low state. Conversely, when at least one intermediate bit of the set of intermediate bits IB1-IB4 is at a logic high state (i.e., when the set of intermediate bits IB1-IB4 corresponds to the set of dynamic pattern bits PB1-PB4, or when the first through fourth FFs FF1-FF4 have undergone the synchronized attack), the intermediate signal IS is outputted at a logic high state.

The inverter IV has an input terminal that is coupled with the comparison circuit 208 (i.e., the output terminal of the fifth logic gate A1), and is configured to receive the output signal OS. The inverter IV further has an output terminal that is configured to output an inverted version of the output signal IOS (hereinafter referred to as an "inverted output signal IOS").

The seventh logic gate A2 has first and second input terminals that are coupled with the output terminals of the sixth logic gate O1 and the inverter IV, and are configured to receive the intermediate signal IS and the inverted output signal IOS, respectively. The seventh logic gate A2 further has an output terminal that is configured to output the error signal ES based on the logic states of the intermediate signal IS and the inverted output signal IOS. Thus, when the intermediate signal IS and the inverted output signal IOS are at logic high states, the error signal ES is outputted at a logic high state, and when one of the intermediate signal IS or the inverted output signal IOS is at a logic low state, the error signal ES is outputted at a logic low state.

In operation, when the critical signal CS is at a logic high state, the first through fourth MUXs M1-M4 select and output the set of dynamic pattern bits PB1-PB4 as the set of selected bits SB1-SB4, respectively. The first through fourth FFs FF1-FF4 thus receive and store the set of dynamic pattern bits PB1-PB4, respectively. When the first through fourth FFs FF1-FF4 are untampered by the attacker, the logic states of the set of intermediate bits IB1-IB4 are same as the logic states of the set of dynamic pattern bits PB1-PB4, respectively. Thus, the first through fourth logic gates XN1-XN4 output the set of comparison signals CPS1-CPS4 at logic high states, respectively. The fifth logic gate A1 receives the set of comparison signals CPS1-CPS4 at logic high states, and outputs and provides the output signal OS at a logic high state to the second functional circuitry 104, thereby facilitating secure communication of the critical signal CS. Further, as the dynamic pattern does not include a '0000' pattern, the intermediate signal IS is at a logic high state, whereas the inverted output signal IOS is at a logic low state as the output signal OS is at a logic high state. Hence, the error detection circuit 210 (i.e., the seventh logic gate A2) outputs and provides the error signal ES at a logic low state to the controller 108. The error signal ES at a logic low state indicates that the first through fourth FFs FF1-FF4 are untampered, i.e., the protection system 106 (and the SoC 100) is devoid of errors.

If the redundancy logic circuit 206 undergoes a synchronized attack when the critical signal CS is at a logic high state, the logic states of the set of intermediate bits IB1-IB4 may be dissimilar to the logic states of the set of dynamic pattern bits PB1-PB4, respectively. Hence, the comparison circuit 208 may output the output signal OS at a logic low state. However, as the set of dynamic pattern bits PB1-PB4 is updated after each reset of the protection system 106 or on the lapse of the predetermined time duration, it is difficult for the attacker that launches the synchronized attack to flip the first through fourth dynamic pattern bits PB1-PB4 stored in the first through fourth FFs FF1-FF4 such that each intermediate bit of the set of intermediate bits IB1-IB4 is at a logic low state. Consequently, the intermediate signal IS is outputted at a logic high state. Further as the intermediate signal IS is at a logic high state and the output signal OS is at a logic low state, the error detection circuit 210 outputs and provides the error signal ES at a logic high state to the controller 108. The controller 108 may then shutdown or reset the SoC 100 to prevent communication of erroneous data (i.e., the output signal OS at a logic low state) to the second functional circuitry 104. The critical signal CS is thus not provided to the second functional circuitry 104.

When the critical signal CS is at a logic low state, the first through fourth MUXs M1-M4 select and output the set of fixed reference bits RB1-RB4 as the set of selected bits SB1-SB4, respectively. The first through fourth FFs FF1-FF4 thus store the set of fixed reference bits RB1-RB4, respectively. When the first through fourth FFs FF1-FF4 are untampered by the attacker, the set of intermediate bits IB1-IB4 is outputted at logic states that are same as the logic states of the set of fixed reference bits RB1-RB4. Each intermediate bit of the set of intermediate bits IB1-IB4 is thus at a logic low state. The dynamic pattern, however, does not include a '0000' pattern. Hence, the set of intermediate bits IB1-IB4 and the set of dynamic pattern bits PB1-PB4 do not match. The comparison circuit 208 thus outputs and provides the output signal OS at a logic low state to the second functional circuitry 104, thereby facilitating secure communication of the critical signal CS. Further, the intermediate signal IS is at a logic low state as each intermediate bit of the set of intermediate bits IB1-IB4 is at a logic low state, and the inverted output signal IOS is at a logic high state as the output signal OS is at a logic low state. The error signal ES is thus outputted at a logic low state.

If the redundancy logic circuit 206 undergoes a synchronized attack when the critical signal CS is at a logic low state, the logic states of the set of intermediate bits IB1-IB4 may be dissimilar to the logic states of the set of fixed reference bits RB1-RB4, respectively. However, the update of the set of dynamic pattern bits PB1-PB4 makes it is difficult for the attacker to flip the set of fixed reference bits RB1-RB4 such that the logic states of the set of intermediate bits IB1-IB4 match the logic states of the set of dynamic pattern bits PB1-PB4, respectively. As a result, the comparison circuit 208 may output the output signal OS at a logic low state. However, as a result of the synchronized attack, at least one intermediate bit of the set of intermediate bits IB1-IB4 is at a logic high state. Hence, the intermediate signal IS is outputted at a logic high state. The error signal ES is thus outputted at a logic high state and provided to the controller 108. The controller 108 may then execute various safety operations in response to the detected error to prevent communication of the critical signal CS to the second functional circuitry 104.

Although FIG. 2 describes that the dynamic pattern includes four dynamic pattern bits (i.e., the first through fourth dynamic pattern bits PB1-PB4), the scope of the present disclosure is not limited to it. In various other embodiments, the dynamic pattern may include less than or more than four dynamic pattern bits, without deviating from the scope of the present disclosure. In such a scenario, a number of the fixed reference bits, the MUXs, the FFs, and the XNOR gates, and a number of input terminals of the OR and AND gates may be same as the number of the dynamic pattern bits.

It will be apparent to a person skilled in the art that the scope of the present disclosure is not limited to facilitating secure communication of a single critical signal (i.e., the critical signal CS) in the SoC 100. In various other embodiments, the protection system 106 may be configured to facilitate secure communication of multiple critical signals in the SoC 100, without deviating from the scope of the present disclosure. Further, the dynamic pattern utilized for facilitating secure communication may be same for each critical signal. Alternatively, multiple dynamic patterns may be utilized for facilitating secure communication of multiple critical signals based on functional partitions in the SoC 100, and reset-domains and power islands of the SoC 100.

Although the present disclosure describes that the critical signal CS is secured against the synchronized attacks, the scope of the present disclosure is not limited to it. In various other embodiments, the protection system 106 of the present disclosure may be utilized for securing critical signals (e.g., the critical signal CS) against asynchronized or sequential attacks (i.e., an attack on a single FF at a time instance), without deviating from the scope of the present disclosure.

Thus, the protection system 106 of the present disclosure facilitates secure communication of the critical signal CS from the first functional circuitry 102 to the second functional circuitry 104. As the dynamic pattern is updated after each reset of the protection system 106 or on the lapse of the predetermined time duration, it is difficult for the attacker to successfully decode the dynamic pattern bits (i.e., the first through fourth dynamic pattern bits PB1-PB4). For example, the power consumed by the protection system 106 for one dynamic pattern is different than the power consumed for another dynamic pattern. Hence, it is difficult for the attacker to successfully decode the dynamic pattern bits by implementing, in an example, a power-snooping based analysis (i.e., by monitoring the power consumed by the protection system 106). As a result, the attacker is unable to launch a successful synchronized attack and flip the critical signal CS from one logic state to another logic state. Further, the increased difficulty in decoding the dynamic pattern bits leads to an increase in the number of attacks attempted by the attacker. The increase in the number of attempted attacks thus increases a cost-of-attack for the attacker. Further, the use of the error detection circuit 210 provides an additional layer of security to the critical signal CS. When the error detection circuit 210 detects that one or more selected bits of the set of selected bits SB1-SB4 stored in the first through fourth FFs FF1-FF4, respectively, are flipped by the attacker, the SoC 100 may be shut down or reset to prevent communication of the erroneous critical signal to the second functional circuitry 104. Thus, the protection system 106 of the present disclosure is more secure as compared to conventional protection systems.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A protection system for facilitating secure communication of a critical signal from a first functional circuitry to a second functional circuitry, the protection system comprising:
   a selection circuit that is coupled with the first functional circuitry, and is configured to receive the critical signal, a set of dynamic pattern bits, and a set of fixed reference bits, wherein the selection circuit is further configured to select and output based on a logic state of the critical signal, one of the set of dynamic pattern bits and the set of fixed reference bits as a set of selected bits; and
   a comparison circuit that is coupled with the second functional circuitry, and is configured to receive the set of dynamic pattern bits and a set of intermediate bits that is derived from the set of selected bits, and output an output signal, wherein the comparison circuit is further configured to provide the output signal to the second functional circuitry when a logic state of the output signal matches the logic state of the critical signal, thereby facilitating secure communication of the critical signal.

2. The protection system of claim 1, further comprising a pattern generator that is configured to generate the set of dynamic pattern bits, wherein the pattern generator is at least one of a true random number generator and a pseudo-random number generator.

3. The protection system of claim 1, wherein the set of dynamic pattern bits is updated based on at least one of a reset of the protection system and a lapse of a predetermined time duration.

4. The protection system of claim 1, wherein the selection circuit includes a set of multiplexers, and wherein each multiplexer of the set of multiplexers has:
   a first input terminal that is configured to receive a corresponding dynamic pattern bit of the set of dynamic pattern bits;
   a second input terminal that is configured to receive a corresponding fixed reference bit of the set of fixed reference bits;
   a select terminal that is coupled with the first functional circuitry, and is configured to receive the critical signal; and
   an output terminal that is configured to output a corresponding selected bit of the set of selected bits.

5. The protection system of claim 1, wherein when the critical signal is activated, the selection circuit is configured to select and output the set of dynamic pattern bits as the set of selected bits, and when the critical signal is deactivated, the selection circuit is configured to select and output the set of fixed reference bits as the set of selected bits.

6. The protection system of claim 1, wherein the comparison circuit includes a first set of logic gates, and wherein each logic gate of the first set of logic gates has:
   a first input terminal that is configured to receive a corresponding dynamic pattern bit of the set of dynamic pattern bits;
   a second input terminal that is configured to receive a corresponding intermediate bit of the set of intermediate bits; and
   an output terminal that is configured to output a corresponding comparison signal of a set of comparison signals.

7. The protection system of claim 6, wherein the comparison circuit further includes a second logic gate having a set of input terminals that is coupled with the output terminals of the first set of logic gates, and is configured to receive the set of comparison signals, and an output terminal that is coupled with the second functional circuitry, and is configured to output the output signal and provide the output signal to the second functional circuitry when the logic state of the output signal matches the logic state of the critical signal.

8. The protection system of claim 1, further comprising a redundancy logic circuit that is coupled with the selection circuit and the comparison circuit, and is configured to receive and store the set of selected bits and output the set of intermediate bits such that each intermediate bit of the set of intermediate bits is derived from a corresponding selected bit of the set of selected bits.

9. The protection system of claim 8, wherein the redundancy logic circuit includes a set of flip-flops (FFs) that is configured to store the set of selected bits, and wherein each FF of the set of FFs has:
   an input terminal that is coupled with the selection circuit, and is configured to receive and store a corresponding selected bit of the set of selected bits; and
   an output terminal that is configured to output and provide a corresponding intermediate bit of the set of intermediate bits to the comparison circuit.

10. The protection system of claim 8, further comprising an error detection circuit that is coupled with the comparison circuit and the redundancy logic circuit, and is configured to receive the output signal and the set of intermediate bits, and output an error signal that is indicative of an error associated with the storage of the set of selected bits in the redundancy logic circuit.

11. The protection system of claim 10, wherein the error detection circuit includes:
   a third logic gate having a set of input terminals that is coupled with the redundancy logic circuit, and is configured to receive the set of intermediate bits, and an output terminal that is configured to output an intermediate signal; and
   a fourth logic gate having a first input terminal that is coupled with the output terminal of the third logic gate, and is configured to receive the intermediate signal, a second input terminal that is configured to receive an inverted version of the output signal, and an output terminal that is configured to output the error signal.

12. The protection system of claim 11, wherein the error detection circuit further includes an inverter having an input terminal that is coupled with the comparison circuit, and is configured to receive the output signal, and an output terminal that is configured to output the inverted version of the output signal.

13. The protection system of claim 1, wherein each fixed reference bit of the set of fixed reference bits is at a logic low state.

14. The protection system of claim 1, wherein the output signal is (i) activated when the set of dynamic pattern bits and the set of intermediate bits match, and (ii) deactivated when the set of dynamic pattern bits and the set of intermediate bits do not match.

15. A system-on-chip (SOC), comprising:
first and second functional circuitries, wherein the first functional circuitry is configured to generate a critical signal for communicating to the second functional circuitry; and
a protection system that is coupled between the first and second functional circuitries, and is configured to facilitate secure communication of the critical signal from the first functional circuitry to the second functional circuitry, the protection system comprising:
  a selection circuit that is coupled with the first functional circuitry, and is configured to receive the critical signal, a set of dynamic pattern bits, and a set of fixed reference bits, wherein the selection circuit is further configured to select and output based on a logic state of the critical signal, one of the set of dynamic pattern bits and the set of fixed reference bits as a set of selected bits; and
  a comparison circuit that is coupled with the second functional circuitry, and is configured to receive the set of dynamic pattern bits and a set of intermediate bits that is derived from the set of selected bits, and output an output signal, wherein the comparison circuit is further configured to provide the output signal to the second functional circuitry when a logic state of the output signal matches the logic state of the critical signal, thereby facilitating secure communication of the critical signal.

16. The SoC of claim 15, wherein the set of dynamic pattern bits is updated based on at least one of a reset of the protection system and a lapse of a predetermined time duration.

17. The SoC of claim 15, wherein the protection system further includes a pattern generator that is configured to generate the set of dynamic pattern bits, and wherein the pattern generator is at least one of a true random number generator and a pseudo-random number generator.

18. The SoC of claim 15, wherein the protection system further includes a redundancy logic circuit that is coupled with the selection circuit and the comparison circuit, and is configured to receive and store the set of selected bits and output the set of intermediate bits such that each intermediate bit of the set of intermediate bits is derived from a corresponding selected bit of the set of selected bits, and wherein the redundancy logic circuit is further configured to provide the set of intermediate bits to the comparison circuit.

19. The SoC of claim 18, wherein the protection system further includes an error detection circuit that is coupled with the comparison circuit and the redundancy logic circuit, and is configured to receive the output signal and the set of intermediate bits, and output an error signal that is indicative of an error associated with the storage of the set of selected bits in the redundancy logic circuit.

20. The SoC of claim 15, wherein the output signal is (i) activated when the set of dynamic pattern bits and the set of intermediate bits match, and (ii) deactivated when the set of dynamic pattern bits and the set of intermediate bits do not match.

* * * * *